United States Patent
Watanabe et al.

(10) Patent No.: US 12,371,098 B2
(45) Date of Patent: Jul. 29, 2025

(54) STEER-BY-WIRE STEERING SYSTEM WITH ARTIFICIAL POSITION HYSTERESIS FOR STEERING WHEEL ANGLE MODIFICATION

(71) Applicants: thyssenkrupp Presta AG, Eschen (LI); Honda Motor Co., Ltd., Tokyo (JP)

(72) Inventors: Yoshinobu Watanabe, Wako (JP); Munetsugu Hanji, Wako (JP); Krisztián Dömötör, Zalaegerszeg (HU); Péter Kakas, Budapest (HU); Zoltán Szander, Tárnok (HU); Daniel György, Budapest (HU); Levente Pásztor, Budapest (HU)

(73) Assignees: THYSSENKRUPP PRESTA AG, Eschen (LI); HONDA MOTOR CO., LTD., Tokyo (JP)

( * ) Notice: Subject to any disclaimer, the term of this patent is extended or adjusted under 35 U.S.C. 154(b) by 366 days.

(21) Appl. No.: 17/969,016

(22) Filed: Oct. 19, 2022

(65) Prior Publication Data
US 2023/0037347 A1 Feb. 9, 2023

Related U.S. Application Data

(63) Continuation of application No. PCT/EP2020/061020, filed on Apr. 20, 2020.

(51) Int. Cl.
*B62D 6/00* (2006.01)
*B62D 5/04* (2006.01)

(52) U.S. Cl.
CPC .......... *B62D 6/008* (2013.01); *B62D 5/0421* (2013.01); *B62D 5/0481* (2013.01)

(58) Field of Classification Search
CPC .... B62D 6/008; B62D 5/0421; B62D 5/0481; B62D 5/001; B62D 6/002
See application file for complete search history.

(56) References Cited

U.S. PATENT DOCUMENTS

| | | | |
|---|---|---|---|
| 10,858,040 B2 * | 12/2020 | Hultén | B62D 6/008 |
| 2004/0039507 A1 * | 2/2004 | Yao | B62D 5/006 |
| | | | 180/443 |

(Continued)

FOREIGN PATENT DOCUMENTS

WO 2016/105316 A1 6/2016

OTHER PUBLICATIONS

Official Communication issued in International Patent Application No. PCT/EP2020/061020, mailed on Feb. 15, 2021.

(Continued)

*Primary Examiner* — Daniel M. Robert
(74) *Attorney, Agent, or Firm* — Keating & Bennett, LLP

(57) ABSTRACT

A method to control a steer-by-wire steering system of a road vehicle including a steering wheel coupled to a steering shaft, a road wheel actuator to turn steerable road wheels, a shaft sensor to detect a rotation of the steering shaft and a controller configured or programmed to generate an operation signal for the road wheel actuator from a signal detected by the shaft sensor, includes determining a real steering wheel angle by the shaft sensor, modifying the real steering wheel angle by applying an artificial hysteresis to create an offset between the real steering wheel angle and a modified steering wheel angle to mimic a behavior of an electromechanical power steering mechanism, and generating the motor torque request for the road wheel actuator based on the modified steering wheel angle.

15 Claims, 2 Drawing Sheets

(56) References Cited

U.S. PATENT DOCUMENTS

| | | | |
|---|---|---|---|
| 2005/0060074 A1* | 3/2005 | Sakai | B62D 6/002 |
| | | | 701/41 |
| 2019/0367074 A1 | 12/2019 | Engels et al. | |
| 2020/0094873 A1 | 3/2020 | Hong | |
| 2023/0037347 A1* | 2/2023 | Watanabe | B62D 5/0481 |

OTHER PUBLICATIONS

Official Communication issued in International Patent Application No. PCT/EP2020/061020, issued on Oct. 25, 2022.

* cited by examiner

STEER-BY-WIRE STEERING SYSTEM WITH ARTIFICIAL POSITION HYSTERESIS FOR STEERING WHEEL ANGLE MODIFICATION

CROSS REFERENCE TO RELATED APPLICATIONS

This application claims the benefit of priority to PCT Application No. PCT/EP2020/061020 filed on Apr. 20, 2020. The entire contents of each application are hereby incorporated herein by reference.

BACKGROUND OF THE INVENTION

1. Field of the Invention

The present invention relates to a method to control a steer-by-wire steering system of a road vehicle and to a steer-by-wire steering system for a road vehicle.

2. Description of the Related Art

In an electromechanical power steering mechanism, a steering shaft is connected to a steering wheel for operation by the driver. The steering shaft is coupled to a steering rack via a gear pinion. Steering rack rods are connected to the steering rack and to steered wheels of the motor vehicle. A rotation of the steering shaft causes an axial displacement of the steering rack by means of the gear pinion which is connected to the steering shaft in a torque-proof manner. An assist force is applied to a steering mechanism by driving an electric motor. Sensors disposed within the vehicle are used to detect the motion and torque of the steering wheel. A computer module calculates an amount of assistive torque to apply via the electric motor.

The mechanical connection between the steering wheel and the pinion has compliance, which results in an angular difference between the steering device and the pinion, if torque is applied on the steering column. The compliance is noticed as a hysteresis component in rotational movement of the steering wheel with respect to the pinion, which is dependent upon torque applied on the steering column.

In steer-by-wire steering systems, there is no mechanical connection between the steering wheel and the steering rack and the steerable wheels and steering movement is achieved by a position controlled road wheel actuator, which reference position is based on the steering wheel angle. If the connection between the road wheel actuator and the steering wheel is simulated and handled to be "infinite stiff", the driver experiences notable difference in driving feel compared to electric power steering systems, especially during high dynamic steering maneuvers and when the steering wheel is moved quickly sinusoidal around a non-center steering wheel position.

SUMMARY OF THE INVENTION

Preferred embodiments of the present invention provide methods to control steer-by-wire steering systems of road vehicles and steer-by-wire steering systems, each of which create a steering feel like electric assisted power steering systems.

Accordingly, a method to control a steer-by-wire steering system of a road vehicle is provided, wherein the steer-by-wire steering system includes a steering wheel coupled to a steering shaft, a road wheel actuator to turn the steerable road wheels, a shaft sensor to detect a rotation of the steering shaft, and a controller configured or programmed to generate an operation signal for the road wheel actuator from a signal detected by the shaft sensor, includes determining a real steering wheel angle by the shaft sensor, modifying the real steering wheel angle by applying an artificial hysteresis to create an offset between the real steering wheel angle and a modified steering wheel angle to mimic a behavior of an electromechanical power steering mechanism, and generating a motor torque request for the road wheel actuator based on the modified steering wheel angle.

The resulting steering feel is similar to electromechanical power steering systems and thus comfortable for the driver.

Preferably, the artificial hysteresis is only able to result in an equal or higher modified steering wheel angle compared to the real steering wheel angle. It is advantageous if the modified steering wheel angle always has the same direction (sign) as the real steering wheel angle. In other words, the sign between the change in value of the modified steering wheel angle and the real steering wheel angle are not opposite.

In a preferred embodiment, the offset is limited by a maximum offset, which is defined by an artificial torsion rate parameter, which describes a linear connection between the real steering wheel angle and the offset. The maximum offset can be dependent on a vehicle speed dependent parameter.

It is preferred that the offset is zero for real steering wheel angles from 0° to a predefined end value v1 in absolute terms.

In particular, the end value v1 lies in a range between 0° and 15° absolute real steering wheel angle.

Preferably, the maximum offset increases linearly from the end value V1 up to a maximum steering wheel angle.

It is advantageous if the offset decreases from the actual offset to zero offset during steering to an endlock position. The amount that the offset decreases can be tunable.

It is further preferred that after reaching the zero offset, it is used as the actual offset during turning of the steering wheel to a larger absolute real steering wheel angle.

Preferably, during steering back to center, the offset increases in absolute terms up to the actual maximum offset. The amount that the offset increases can be tunable.

It is preferred that once the maximum offset is reached, when turning back, the actual maximum offset is used as the actual offset for the rest of the steering operation back to the end value.

Further, a steer-by-wire steering system for a road vehicle includes a road wheel actuator and a controller configured or programmed to generate an operation signal for the road wheel actuator and to carry out the above-described method. Preferably, the road wheel actuator operates a gear rack via a rack-and-pinion gear, which is part of a front wheel axle. It is preferred that the controller includes a position controller configured or programmed to generate a motor torque request based on the actual or an estimated position of the rack and a requested rack position, wherein the requested rack position is dependent on the modified steering wheel angle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
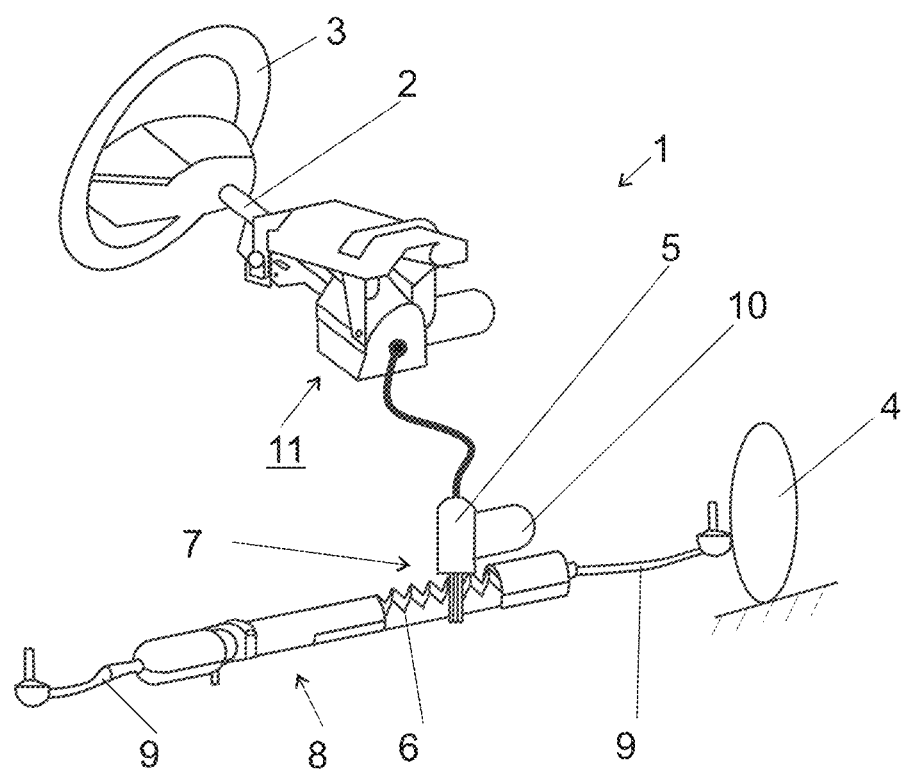
FIG. 1 is a schematic illustration of a steer-by-wire steering system of a motor vehicle.

FIG. 1 is a schematic drawing of a steer-by-wire system 1 with a steering shaft 2 connected to steering device 3. There is no mechanical connection between the steering device 3 and the road wheels 4. A road wheel actuator 5 operates a gear rack 6 via a rack-and-pinion gear 7, which is part of a front wheel axle 8. The front wheel axle 8 includes two tie rods 9 for road wheels 4, of which only one road wheel 4 is shown.

When a driver operates the steering device 3, steering shaft 2 is rotated, which is detected by a shaft sensor, which is not shown in the drawings. When the vehicle is switched on, a controller 10 generates an operation signal for the road wheel actuator 5 from the signal detected by the shaft sensor. By operating gear rack 6 with the operation signal, the front wheel axle 8 is moved sideways and the road wheels 4 are turned. A feedback torque on the steering device 3 is calculated mainly based on the position of the steering device 3 (steering shaft) and modified according to the operating conditions of the vehicle and the road wheel actuator 5. The feedback torque is applied to the steering shaft 2 by a feedback actuator 11, so that the operator can recognize the feedback in the steering device 3.

The controller 10 includes a position controller configured or programmed to generate a motor torque request based on the actual (measured) position of the rack 6 and a requested rack position. The road wheel actuator 5 thus follows a reference position signal. The requested rack position is dependent on the steering wheel angle α. To mimic electromechanical power steering mechanisms, the steering wheel angle α is modified by applying an artificial hysteresis, which creates an offset in the steering wheel angle and the requested rack position, respectively. This way the road wheel actuator is falling behind in movement compared to the steering wheel movement, which is similar to the behavior in electromechanical power steering mechanisms. For the actual value of the offset, a build-up and a fade-away of the offset can be adapted and are tunable.

The offset is created between the real steering wheel angle α and a modified steering wheel angle α, which is used instead of the real steering wheel angle α in the position controller to calculate the requested rack position.

Figure 2:
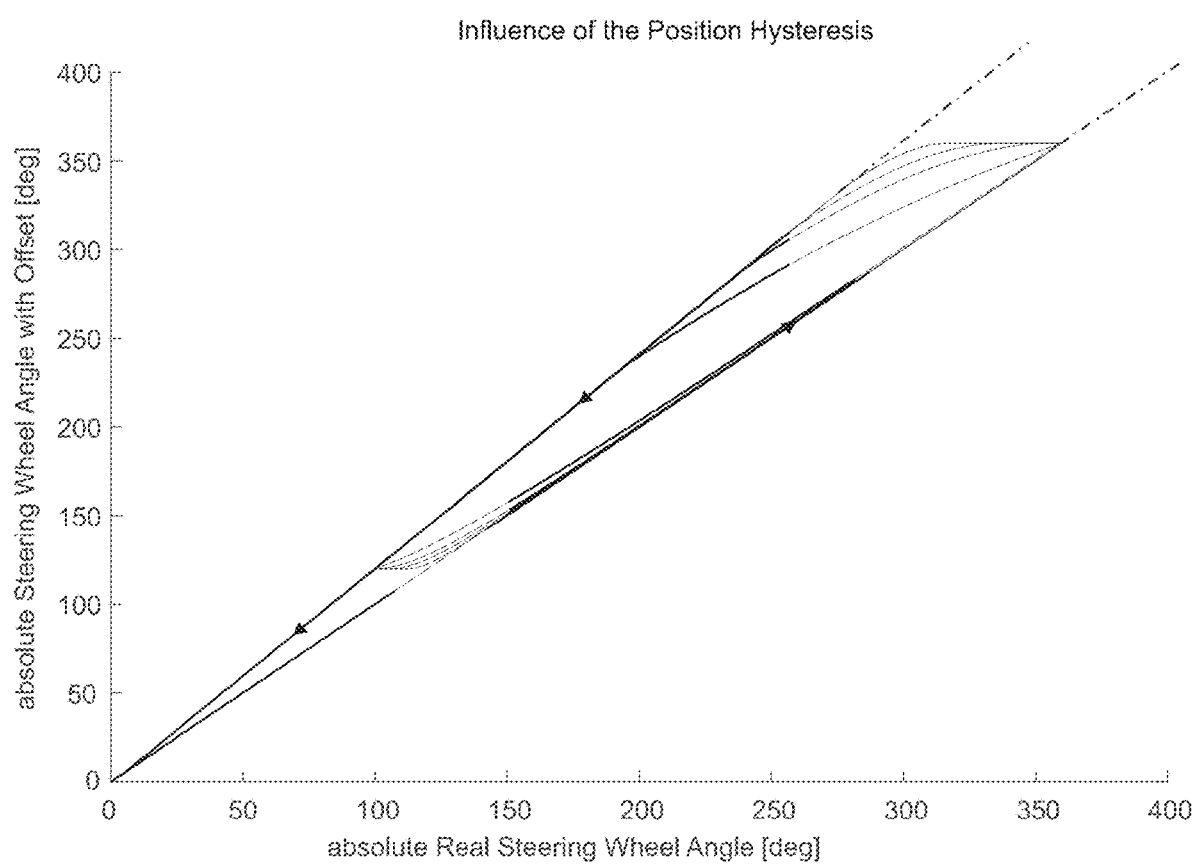
FIG. 2 shows a diagram with the influence of an artificial position hysteresis on the steering wheel angle.

FIG. 2 shows the absolute modified steering wheel angle $\alpha_{mod}$, including the offset, plotted against the absolute real steering wheel angle α. The steering wheel is steered from 0 to 360 degrees, than a repeated maneuver is coming, every iteration with a different build-up and fade-away rates: steering back from about 360 degrees to about 100 degrees and then from about 100 degrees to about 360 degrees (just to show the effect of the different shape values during steering in and steering out). After some repetition the steering wheel is steered back from about 360 degrees to 0 degree. The dashed lines are used for reference only. The arrows represent the steering direction. They mark the relevant dependencies.

The offset is a hysteresis, which is only able to result equal or higher modified steering wheel angle α than the real steering wheel angle α in absolute terms and the sign of the modified steering wheel angle is equal with the sign of the real steering wheel angle. The offset is not able to result in opposite sign between the change in value of the real steering wheel angle α and the modified steering wheel angle $\alpha_{mod}$.

During steering from the straight-ahead, center position of the steering wheel (absolute real steering wheel angle is zero) to the endlock(360°) the offset is zero, which means the steering wheel angle is not modified.

During steering back from the endlock position to the center position the offset increases in absolute terms up to the actual maximum offset.

The characteristic of the offset build-up is tunable. The build-up is shown for four different examples. In these cases, the maximum offset is reached at real steering wheel angles α between about 200° and about 260°. Once the maximum offset is reached, the actual maximum offset is used as the actual offset for the rest of the steering operation back to v1.

A maximum offset is defined by an artificial torsion rate parameter, which describes linear connection between the real steering wheel angle α and the offset starting from a predefined end value v1. The range between the straight-ahead, center position of the steering wheel (absolute real steering wheel angle is zero) and the end value v1 is called "dead zone". Within the dead zone the maximum offset is zero and thus the modified steering wheel angle $\alpha_{mod}$ is equal to the real steering wheel angle α. From the starting value v1 on the maximum offset is increasing linearly based on the artificial torsion rate parameter. The maximum offset can be influenced by a vehicle speed dependent parameter.

If during steering back from the endlock position to the center position the steering direction is changed (to the endlock position instead of to the center position), the offset decreases from the maximum offset to zero offset, which is reached in the example of FIG. 2 at about 300° real steering wheel angle α. The characteristic of the offset fade-away is tunable, independent of the offset build-up. The fade-away is shown for four different examples. Once the zero offset is reached, it is used as the actual offset during turning of the steering wheel to a larger absolute angle. In other words, the modified steering wheel angle $\alpha_{mod}$ equals the real steering wheel angle α.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method to control a steer-by-wire steering system of a road vehicle including a steering wheel coupled to a steering shaft, a road wheel actuator to turn steerable road wheels, a shaft sensor to detect a rotation of the steering shaft and a controller configured or programmed to generate an operation signal for the road wheel actuator from a signal detected by the shaft sensor, the method comprising:
   determining a real steering wheel angle (α) by the shaft sensor;
   modifying the real steering wheel angle (α) by applying an artificial hysteresis to create an offset between the real steering wheel angle (α) and a modified steering wheel angle (a mod) to mimic a behavior of an electromechanical power steering mechanism; and
   generating a motor torque request for the road wheel actuator based on the modified steering wheel angle ($\alpha_{mod}$);
   the offset is limited by a maximum offset, which is defined by an artificial torsion rate parameter, which describes a linear connection between the real steering wheel angle ($\alpha$) and the offset; and the maximum offset is dependent on a vehicle speed dependent parameter.

2. The method according to claim 1, wherein the artificial hysteresis is only able to result in an equal or higher modified steering wheel angle ($\alpha_{mod}$) than the real steering wheel angle ($\alpha$) in absolute terms.

3. The method according to claim 1, wherein a polarity of a change in value of the modified steering wheel angle ($\alpha_{mod}$) and a polarity of the real steering wheel angle ($\alpha$) are not opposite.

4. The method according to claim 1, wherein the offset is zero when the real steering wheel angle ($\alpha$) is from 0° to a predefined end value (v1) in absolute terms.

5. The method according to claim 4, wherein the predefined end value (v1) is in a range between 0° and about 15° absolute real steering wheel angle.

6. The method according to claim 4, wherein a maximum offset increases linearly from the predefined end value (v1) up to the maximum steering wheel angle.

7. The method according to claim 6, wherein the offset decreases from the actual offset to zero offset during steering to an endlock position.

8. The method according to claim 7, wherein an amount that the offset decreases is tunable.

9. The method according to claim 6, wherein after reaching the zero offset, it is used as the actual offset during turning of the steering wheel to a larger absolute real steering wheel angle ($\alpha$).

10. The method according to claim 1, wherein during steering back to center, the offset increases in absolute terms up to an actual maximum offset.

11. The method according to claim 10, wherein an amount that the offset increases is tunable.

12. The method according to claim 10, wherein once the maximum offset is reached, when turning back, the actual maximum offset is used as the actual offset for a remainder of the steering operation back to the predefined end value (v1).

13. A steer-by-wire steering system for a road vehicle including a road wheel actuator and a controller configured or programmed to generate an operation signal for the road wheel actuator, wherein the controller is configured or programmed to carry out a method to control the steer-by-wire steering system of the road vehicle, the road vehicle including a steering wheel coupled to a steering shaft, the road wheel actuator to turn steerable road wheels, a shaft sensor to detect a rotation of the steering shaft and the controller configured or programmed to generate an operation signal for the road wheel actuator from a signal detected by the shaft sensor, the method comprising:

determining a real steering wheel angle ($\alpha$) by the shaft sensor;

modifying the real steering wheel angle ($\alpha$) by applying an artificial hysteresis to create an offset between the real steering wheel angle ($\alpha$) and a modified steering wheel angle ($\alpha_{mod}$) to mimic a behavior of an electro-mechanical power steering mechanism;

generating a motor torque request for the road wheel actuator based on the modified steering wheel angle ($\alpha_{mod}$);

the offset is limited by a maximum offset, which is defined by an artificial torsion rate parameter, which describes a linear connection between the real steering wheel angle ($\alpha$) and the offset; and the maximum offset is dependent on a vehicle speed dependent parameter.

14. The steer-by-wire steering system according to claim 13, wherein the road wheel actuator operates a gear rack via a rack-and-pinion gear, which is part of a front wheel axle.

15. The steer-by-wire steering system according to claim 13, wherein the controller includes a position controller configured or programmed to generate a motor torque request based on an actual position of the rack and a requested rack position, wherein the requested rack position is dependent on the modified steering wheel angle ($\alpha_{mod}$).

* * * * *